Sept. 27, 1927.
W. C. HEDGCOCK
1,643,495
RAILROAD CAR TRUCK STRUCTURE
Filed Feb. 19, 1927    2 Sheets-Sheet 1
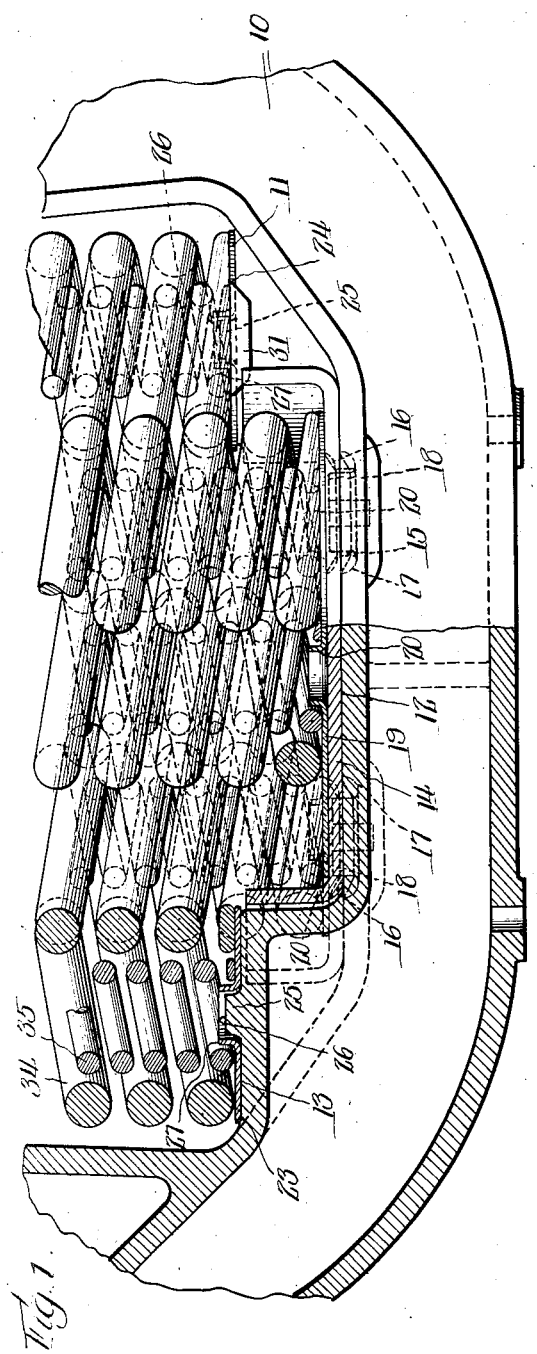
Witness:
A. Burkhardt
Inventor:
William C. Hedgcock,
By Wilkinson, Huxley, Byron & Knight
Attys

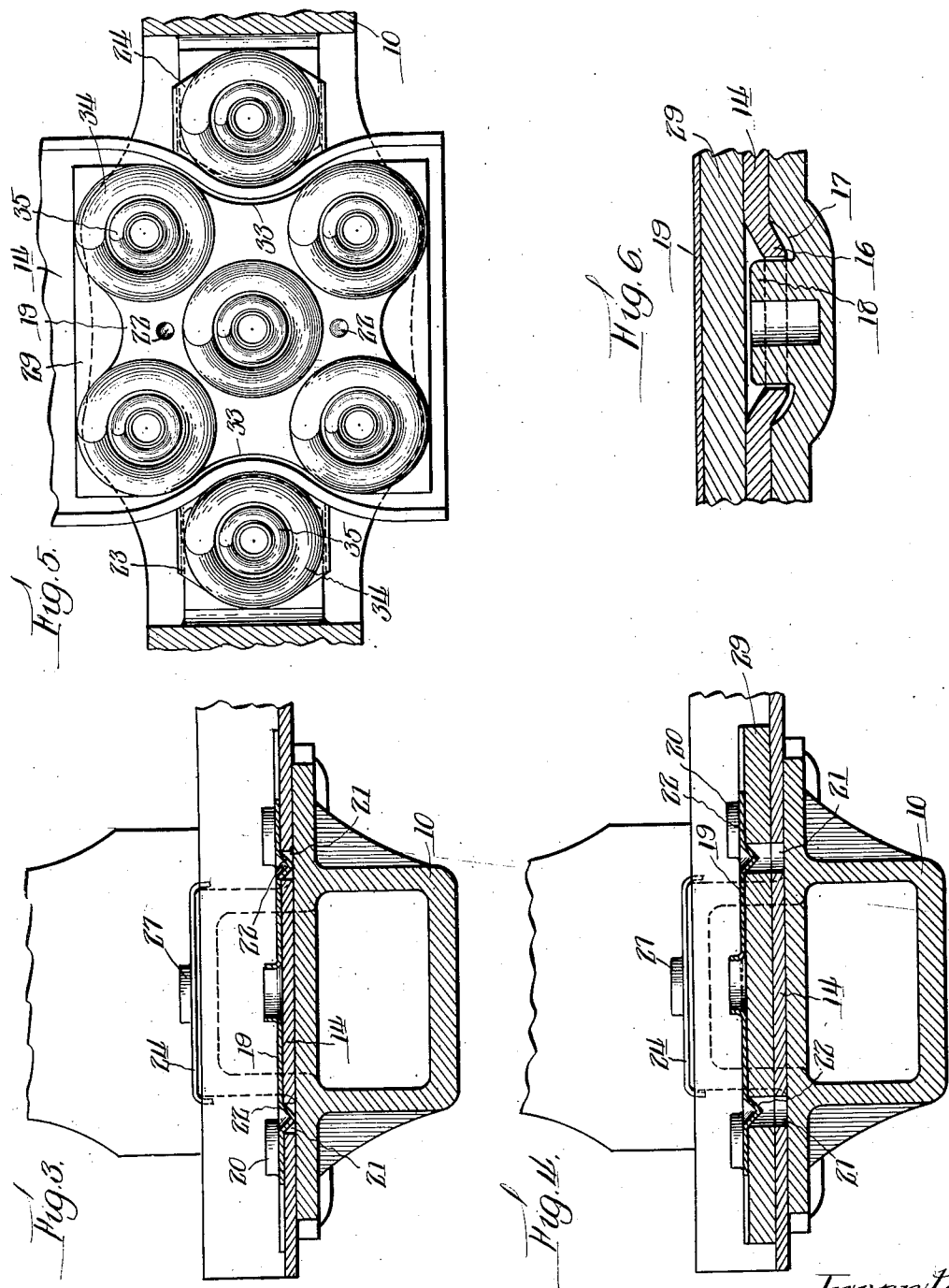

Patented Sept. 27, 1927.

1,643,495

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

RAILROAD-CAR-TRUCK STRUCTURE.

Application filed February 19, 1927. Serial No. 169,461.

My invention relates to improvements in railroad car truck construction, and more especially to means for maintaining the car coupler at substantially a constant elevation above the level of the tracks, my improvement embracing a combination of a truck side frame, a truck bolster, supporting springs for the truck bolster and car body, and a shim adapted to be interposed to compensate for any wear which tends to lower the coupler.

Truck side frames now in use are composed of an upper compression member, a lower tension member connected to form an integral structure by two vertical columns, and which form by their arrangement a rectangular opening to serve as a housing for the spring assembly and the end of the truck bolster. The upper surface of the lower tension member constitutes a seat for the springs, the springs serving as a resilient supporting column for the truck bolster upon which the car body is carried.

In practice it has been found that due to wear of the car wheels and the car journals, the side frame is lowered, and consequently the bolster supported on the upper end of the spring column which is of comparatively fixed height for any given load, is correspondingly lowered causing a variation in the elevation of the coupler relative to the level of the tracks. It is necessary to maintain the couplers of all railroad cars at a substantially constant elevation in order that the couplers of two cars may be properly engaged when coupled. To compensate for such wear, one method is to interpose shims between the spring seats on the side frame and the spring plates which support the springs in order to produce effective bearing spring seats at the same level as that of the original spring seats prior to any wear.

Interposing shims between the spring seats on the side frames and the springs, as described above, is a common procedure and generally does not require any special provision for doing so. However, with the truck arrangement shown in United States Letters Patent No. 1,457,345, granted to G. S. Chiles, dated June 5, 1923, the shape and arrangement of truck parts are such as to require a special shimming arrangement. With this truck construction, the side frames are provided with spring seats on different levels, the springs being on correspondingly different elevations, and the truck bolster has its end stepped to coincide with the different spring levels on which it is supported. The distance between the upper compression member and the spring seat of the side frame is limited by clearance conditions and cannot be exceeded. The height of the springs is fixed by standards of capacity and interchangeability required and the depth of the end of the bolster must be sufficient for strength and to provide adequate wearing surface between its sides and the column members of the side frame. The result is that the space in the opening in the side frame is nearly all occupied by the bolster end and spring assembly, thus providing limited clearance for the raising of the bolster sufficiently to insert springs and shims. Due to the stepped shape of the side frame spring seat and the bolster end, the clearance for inserting the springs and shims onto the elevated seats is particularly limited and requires a special provision. In addition to inserting a shim, it is necessary to provide as well, means for holding the shim in place, and any means projecting up from the seat a height sufficient to serve as a holding means for both the shim and the spring plate will limit the space provided for the coil springs an amount which will prohibit the installation of the latter. An alternative is to increase the height of the opening forming the spring housing or to decrease the height of the coil springs, both of which are undesirable, however, inasmuch as the first would result in a weaker frame structure or bolster end, and the second would necessitate a change from the desired spring characteristics.

It can be seen, therefore, that any attempt to elevate the bolster to compensate for the lowering of the spring seats due to wear would involve difficulties when it is attempted to further confine the elements comprising the spring assemblies by the insertion of shims between these parts. It is common to provide upstanding dowels on the spring seats which cooperate with the spring plates in order to maintain the spring plates and coiled springs in proper position, the spring plates being supplied to form better bearing seats for the ends of the coils. A small amount of clearance is necessary in order to permit the installation of coiled springs, it being necessary when installing to elevate the lower end of the spring an amount sufficient to permit the same to be lifted over the dowel pin, the dowel pin usually being positioned centrally of the coils. The dimensions and the weight of the coiled springs cannot be altered inasmuch is they are proportioned to accommodate a load commensurate with the capacity of the car. The problem thus arises as to how the shim may be inserted and maintained in fixed relation to the parts and yet dispense with the necessity of increasing the height of the dowel pin.

One of the objects of my invention is to provide an improved railroad truck construction which will maintain the coupler at substantially a constant elevation above the level of the tracks.

Another object of my invention is to provide an improved truck structure embodying an arrangement in which a shim is adapted to be interposed between the spring plate and the spring seat in truck spring assemblies now in use, and which can be inserted into limited space without the necessity of compressing the coils during the process of installation.

It is the further object of my device to provide a shim, the under side of which is adapted to rest on and be held by the spring seat, cooperating with the upstanding dowel in a manner similar to that of the spring plate, and further provided with an upper surface which will receive the spring plate, together with means for maintaining the spring plate in fixed relation.

It is the further object of my invention to provide shims for a side truck spring assembly which has stepped spring seats, one of which has a spring plank mounted thereon. In this instance, a shim is provided with a lower surface adapted to rest on the spring plank and to receive on its upper surface a spring plate, all of the parts being maintained against displacement.

Other objects of my invention will be readily understood from the following description when considered in connection with the accompanying drawings, in which—

Figure 1 is a fragmentary side elevation of a side frame for railroad trucks showing an assembly comprising spring seats, a spring plank and spring plates, the latter forming a bearing seat for the coiled springs;

Figure 2 is a similar view with the shims interposed between the spring plates and the spring seats;

Figure 3 is a cross-sectional view of Figure 2 taken on line 3×—3×, showing a spring seat, a spring plank and a spring plate;

Figure 4 is a view similar to Figure 3 with a shim interposed;

Figure 5 is a plan view of the assembly showing the general arrangement of spring coils, a spring plate and a shim;

Figure 6 is an enlarged view in cross-section taken on line 6×—6× of Figure 2, disclosing a means for maintaining the spring plate and the spring seat against displacement.

Referring to Figure 1 of the drawings, which discloses a spring assembly mounted on the side frame of a railroad car truck, my invention embodies a side frame, such as designated at 10, having spring seats such as shown at 11, 12 and 13, two of which are shown as elevated, the centrally located spring seat 12 being adapted to receive a spring plank 14. Spring plank 14 is provided with perforations having depending edges, as shown at 16, which are adapted to fit in recesses 17 formed in the spring seat 12 and to embrace the dowel 18 projecting up from the center of the recesses. Mounted on top of the spring plank, as shown, is a spring plate 19 provided with upstanding projections, such as shown at 20, adapted for engagement with the coiled springs 34, 35. As shown in Figure 3, spring plank 14 is provided with perforations 21 which are adapted to receive the depending conical protrusion 22 formed on the under side of the spring plate and which serve to maintain the spring plate fixed relative to the spring plank.

In the arrangement for the elevated spring seat, the spring plank is omitted, the spring plates 23 and 24 being maintained in fixed relation by engagement with the dowel 25 and the downwardly extending tongues 31 which engage the sides of the spring seat after the plate has been placed in position. Around the opening 26 in the plate is the upstanding circular flange 27, which flange forms means for engaging the coil springs in the same manner as described relative to bosses 20 on plate 19.

When it is desired to take up wear, shims are interposed in the manner shown in Figure 2, contemplating a shim structure such as shown at 28 to be applied to the elevated steps of the spring seat, and as shown at 29, for the intermediate spring seat. The shim 28 is provided with a central perforation 30 which is adapted to fit over the dowel pins 25 in the same manner as that of the spring plates, the upper surface, however, being free from any projections so as to avoid any decrease in distance between the top of the shims and the lower surface of the bolster. The spring plates are adapted to be positioned on top of the shims, as shown in Figure 2, to form an elevated bearing seat for the spring coils, and otherwise in the same manner as that before the shims are inserted. The shims for the lower bearing plate are positioned on top of the spring plank, as shown in Figure 5, the end walls being provided with depressions 33 adapted to engage the inwardly projecting shoulders on the upturned ends of the spring plank and are in this manner maintained in fixed relation relative thereto. The central spring plate is further provided with perforations 32 corresponding to those previously mentioned in the spring plank, shown at 21 in Figure 3, which form means for receiving the conical depressions 22 of the spring plate and thereby serve as means for retaining the spring plate in fixed relation, the relationship of the spring coils to the plate being exactly the same whether the shim is employed or not.

In operation, when it is desired to elevate the bolster of the car to compensate for wear, the bolster is jacked up to a position to engage as a limit the top compression member of the truck side frame, and thereby afford maximum clearance between the parts and spring assembly. The central coiled springs and their spring plate are removed but the elevated springs and their plates are not removed. The elevated coiled springs are then held with the top of the coils in the desired location against the bolster and the spring plates held against the bottom of the coils, thus providing space under the spring plates to slide in the shims and position the latter with their holes over the dowels on the stepped spring seats. Then seating the elevated springs and spring plates in this position, the tongues 31 on the ends of the plates engage the edges of the shims in a manner to hold them against lateral displacement, longitudinal displacement being limited by end engagement with the vertical column of the side frame on one side and the center coils on the other side. The center shim and spring plate are then positioned on the spring plank and the center springs then put in place between the spring plate and bolster, there being sufficient clearance for this operation.

It can be seen that my invention affords means for overcoming the difficulties heretofore encountered with this truck arrangement, and that I have provided a means for maintaining the couplers at a constant elevation above the level of the tracks. The above description and the disclosure in the drawings is merely illustrative of a preferred embodiment of my invention, the scope whereof is set forth in the appended claims.

I claim:

1. In a car truck, the combination of a side frame having a spring seat, a spring plate and a shim, said spring seat having engaging means thereon and being adapted to receive selectively said plate or said plate and shim in order to compensate for wear which would tend to lower the position of the coupler of the car and thus maintain the coupler at a predetermined elevation above the level of the tracks, said plate or plate and shim being held by said engaging means.

2. In a car truck, the combination of a side frame having a spring seat and a spring plate, a shim adapted to be interposed between said spring seat and spring plate to compensate for wear so as to maintain the coupler of the car at a predetermined elevation above the level of the tracks, said shim being constructed to rest on said spring seat and be held thereby and to receive said spring plate, and means for holding said spring plate on said shim.

3. In a device of the character described, the combination of a truck side frame having stepped spring seats, a spring plank on one of said seats, shims mounted on said plank and on said other seats, and spring plates mounted on said shims.

4. In a device of the character described, the combination of a truck side frame having a spring seat thereon which is constructed to receive and hold a spring plate or a shim selectively, a shim mounted on said seat and presenting an upper surface adapted to receive said plate and a spring plate mounted on said shim.

5. In a device of the character described, the combination of a truck side frame having a spring seat, said seat being adapted to receive a spring plate or a shim selectively and having means for preventing displacement of said spring plate or shim, a shim mounted on said seat and held thereon by said means for preventing displacement, a spring plate mounted on said shim, and means for holding said spring plate.

6. In a device of the character described, the combination of a truck side frame having stepped spring seats, a spring plank mounted on one spring seat and having upturned flanges to conform to the sides of adjacent steps, a shim on said plank held by said upturned flanges, a spring plate on said shim likewise engaging and held by said upturned flanges.

7. In a device of the character described, the combination of a truck side frame having a spring seat, a shim and a spring plate, said plate having an undersurface which renders it capable of being positioned and maintained on either the spring seat or said shim, said shim having an undersurface which renders it capable of being positioned and maintained on the spring seat, said spring seat having an upper surface and cooperating means adapted to receive and maintain thereon either the shim or the spring plate.

8. In a device of the character described, the combination of a truck side frame having a spring seat, a spring plate and a shim therefor, said spring seat having locking means on its upper surface, said spring plate having a lower surface adapted to rest on said spring seat and to engage said locking means, said shim having an upper surface adapted to receive said spring plate, and an under surface adapted to rest on said spring seat and to engage said locking means.

Signed at Chicago, Illinois, this 16th day of February, 1927

WILLIAM C. HEDGCOCK.